United States Patent [19]
Logan et al.

[11] Patent Number: 6,116,631
[45] Date of Patent: *Sep. 12, 2000

[54] SHOCK ABSORBING TRAILER HITCH ASSEMBLY

[75] Inventors: Jeffrey D. Logan, Wewoka; John W. Turner, Seminole, both of Okla.

[73] Assignee: Easy Rider Incorporated, Wewoka, Okla.

[*] Notice: This patent is subject to a terminal disclaimer.

[21] Appl. No.: 09/193,173

[22] Filed: Nov. 16, 1998

[51] Int. Cl.[7] .................................................. B60D 13/00
[52] U.S. Cl. ........................... 280/483; 280/474; 280/43; 280/490.1; 280/511
[58] Field of Search .......................... 280/474, 43, 490.1, 280/511, 483

[56] References Cited

U.S. PATENT DOCUMENTS 5,836,603  11/1998  Logan et al. ............................. 280/483

*Primary Examiner*—Lanna Mai
*Assistant Examiner*—Toan C To
*Attorney, Agent, or Firm*—Jackson Walker L.L.P.

[57] ABSTRACT

A trailer hitch assembly for attachment to a vehicle and trailer is provided with a fixed support member attached to the vehicle. A floating hitch member is attached to the trailer. Variable pressure shock absorbers interconnect the hitch and support. Rollers on the support member engage with guide tracks on the floating hitch member to control movement of the assembly.

6 Claims, 10 Drawing Sheets

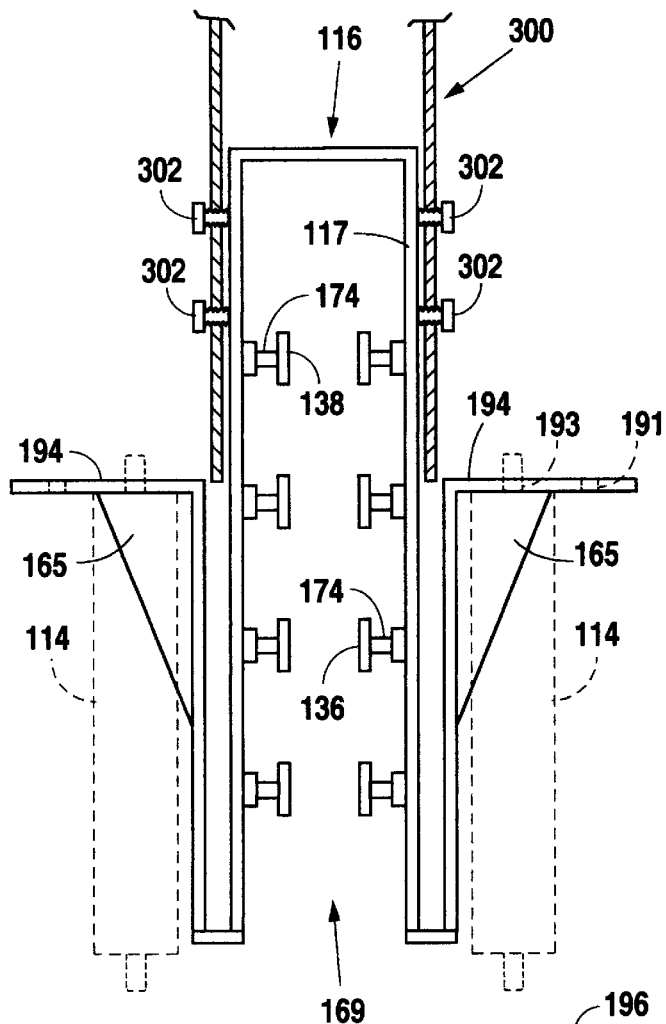
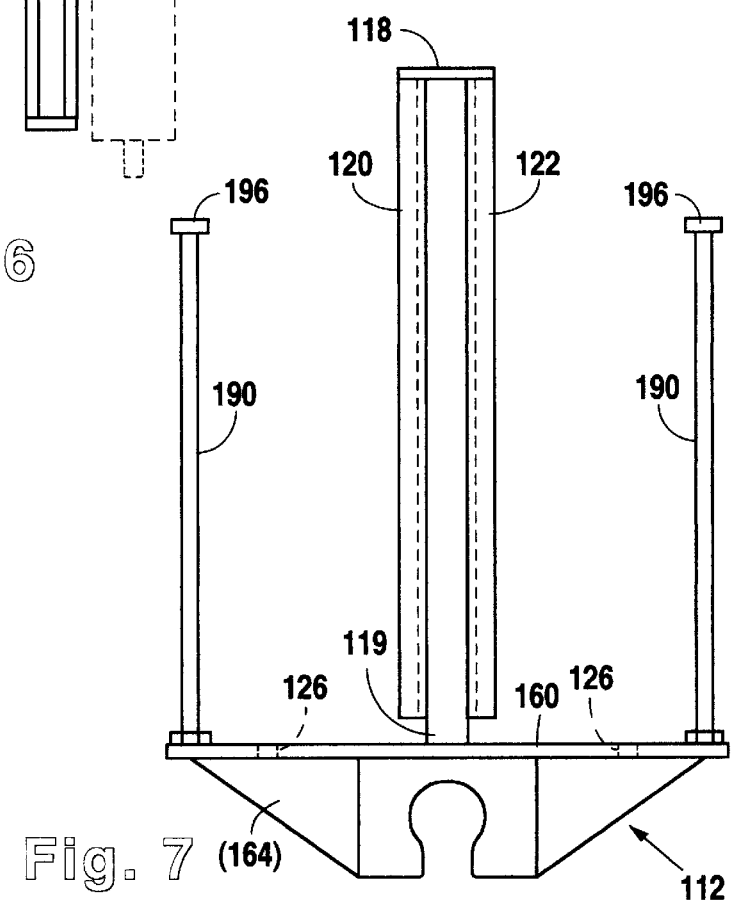

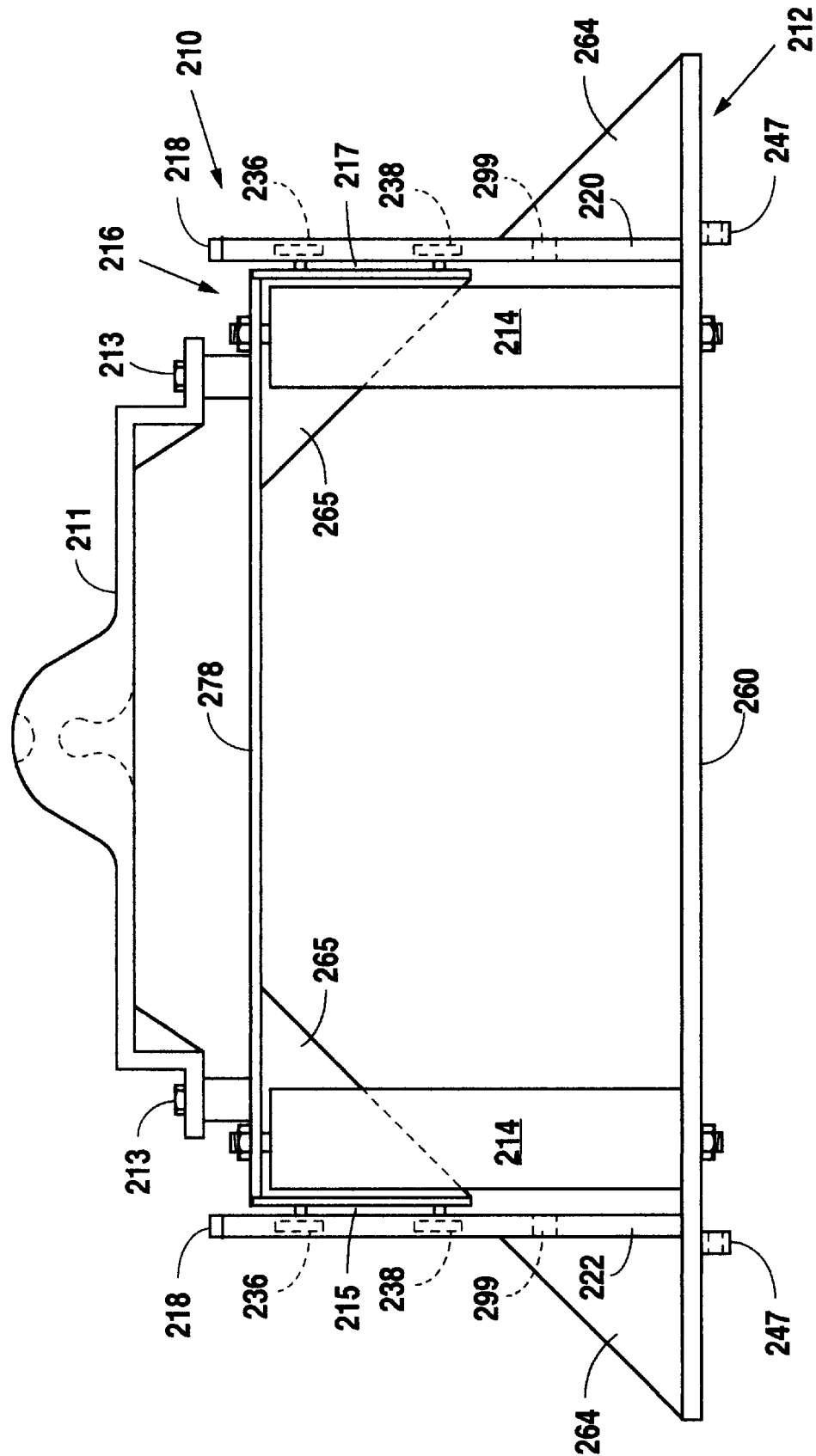

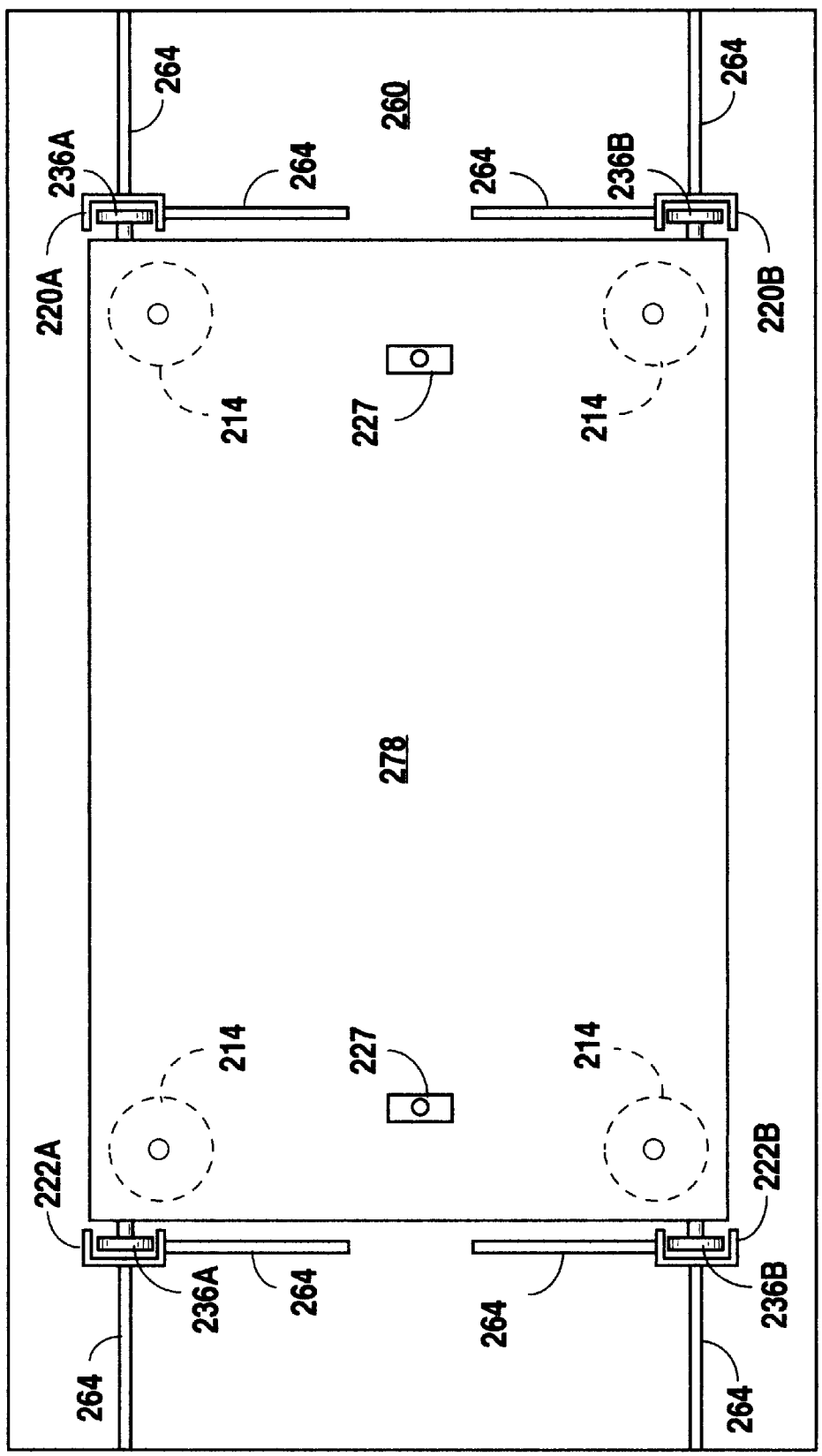

SHOCK ABSORBING TRAILER HITCH ASSEMBLY

BACKGROUND OF THE INVENTION

This is a continuation-in-part application of copending U.S. Pat. No. 5,836,603, issued Nov. 17, 1998. U.S. patent application Ser. No. 829,999, filed Apr. 3, 1997.

Field of The Invention

Applicant's invention relates to trailer hitch devices for attachment to automobiles, pick-up trucks, recreational vehicles, tractor trailers and like vehicles. More particularly, the invention relates to trailer hitch devices which are specially constructed so as to minimize the transmission of shock forces induced between a towing vehicle and an attached trailer while traveling over rough roads. An air bag shock absorber assembly is provided to allow variable resistance to movement, and guide tracks with rollers are used to limit travel in both horizontal and vertical directions.

The relevant prior art consists of patents by Jones (U.S. Pat. No. 3,708,183); Taylor Jr. (U.S. Pat. No. 4,148,498); and Jacks (U.S. Pat. No. 4,215,876). Jones discloses a trailer hitch having a frame with vertical side members which are compression springs inside the members to absorb shock. While this invention does provide for an adjustable height at the ball joint, it does not allow the user to readily vary the amount of resistance to vertical travel to accommodate a variety of load conditions. Taylor Jr. discloses a trailer hitch using springs and ball joints with adjustable elevation. However, this invention consists of a complicated assembly of parts, which are difficult and expensive to manufacture. Finally, Jacks discloses a trailer hitch using a leaf spring member to provide variable resistance to vertical travel. However, this invention depends on a sliding plate disposed between two vertical members to limit the horizontal and vertical travel of the ball joint. The Jacks mount has a tendency to bind and is susceptible to failure induced by excessive wear without lubrication.

SUMMARY OF THE INVENTION

The present invention provides a shock absorbing trailer hitch assembly which consists of few components: an air bag shock absorber subassembly and a tracked bearing subassembly which combine to reduce the friction of and provide variable control over vertical movement. A support member is attachable to a vehicle while a floating hitch member is attachable to a trailer. Rollers on the hitch member cooperate with guide tracks on the support member to control the movement of the hitch assembly. It should be understood that the guide tracks maybe affixed to or part of the floating hitch assembly while the rollers form part of the support member.

Variable pressure air shock absorbers interconnect the support member and the floating hitch to provide a controlled cushioning of the shock forces developed between the vehicle and the trailer. As an alternative to air shock absorbers, pneumatic or mechanical spring assemblies may be utilized where appropriate.

BRIEF DESCRIPTION OF THE DRAWINGS

FIG. 6 illustrates a side elevation view of the floating hitch component of the gooseneck embodiment of the present invention.

FIG. 7 illustrates a side elevation view of the support member of the gooseneck embodiment of the present invention.

FIG. 8 illustrates a fifth-wheel embodiment of the present invention.

FIG. 9 is a top view of the fifth-wheel embodiment of the present invention.

DETAILED DESCRIPTION OF THE PREFERRED EMBODIMENT

Figure 1:
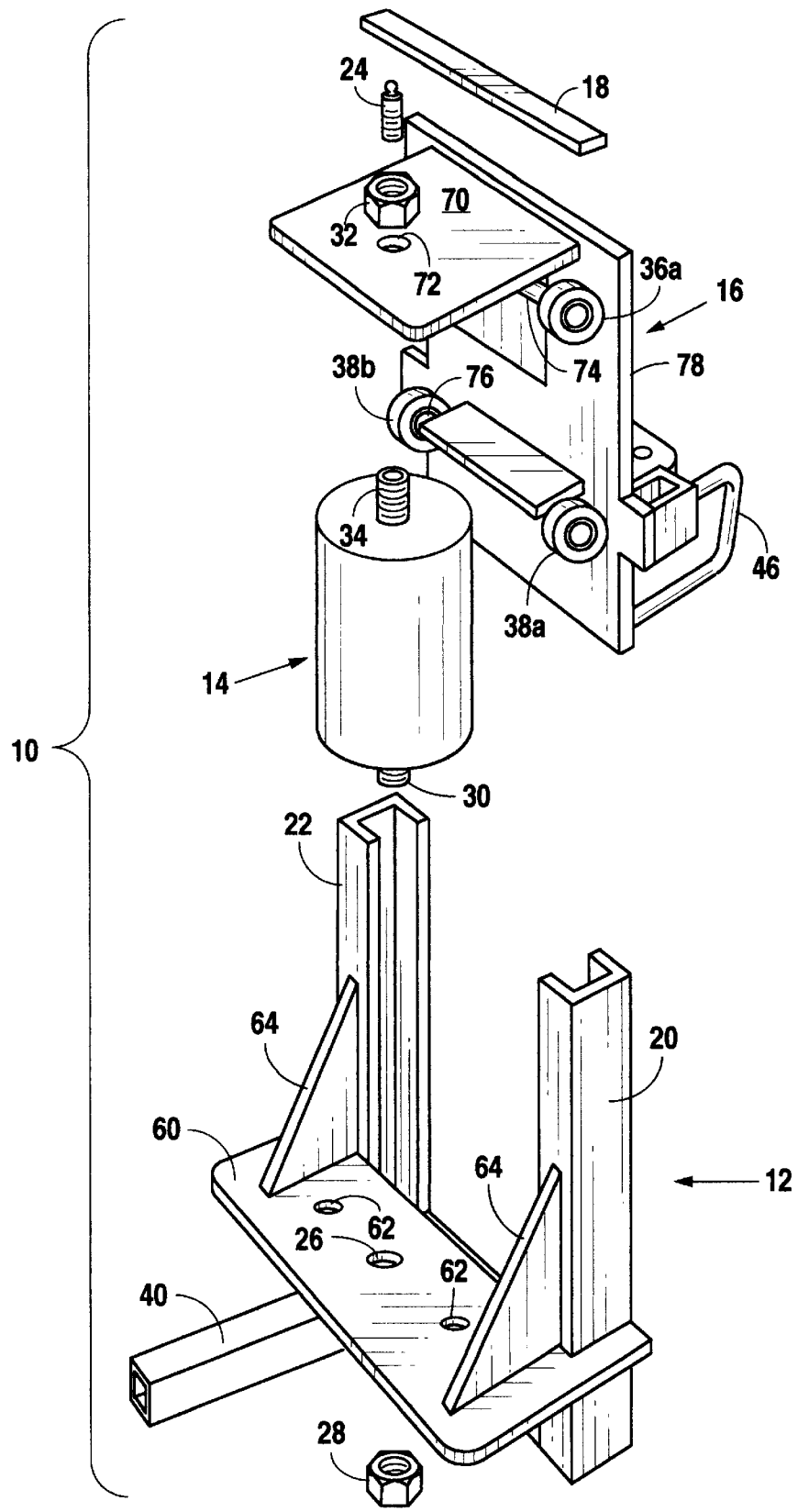
FIG. 1 illustrates an exploded perspective view of a first embodiment of the instant invention.

FIG. 1 illustrates an exploded perspective view of a first embodiment of shock absorbing trailer hitch assembly (10) of the present invention. It can be seen that the assembly consists of a fixed lower support member (12), an airbag shock absorber assembly (14), a movable or floating hitch component (16), and one or more keeper bars (18) which can be affixed to the support member (12) to prevent the hitch component (16) from moving beyond the ends of the supporting member guide tracks (20 and 22). The fixed lower support member (12) is provided with a mounting plate (60) having suitable attachment holes (62) for attaching the support member (12) to the towing truck. A plurality of upwardly extending, spaced apart, and generally parallel U-shaped guide tracks (20 and 22) are securely affixed on opposite sides of the mounting plate (60). Gussets (64) are welded to tracks (20 and 22) and mounting plate (60) to provide rigid strength and to ensure that there is no twisting of the tracks. FIG. 1 also shows an extended tubular arm (40) which may be attached to the mounting plate (60) for attaching the support member (12) to a receiver-type trailer mount on the rear of the vehicle.

The floating hitch component (16) has an upper bracket (70) with a mounting hole (72) for attachment of the top and of the absorber assembly (14) to floating component (16). A plurality of rollers are attached to floating component (16).

Upper roller or bearing set (36a and 36b) are affixed to shaft (74) in parallel, spaced apart relation. A lower set of rollers (38a and 38b) are attached to a second shaft (76) in the same way. The rollers may be sealed, pre-lubricated bearings or may be of sufficient size to require regular, manual lubrication. In any case, the rollers are freely rotatable about the shaft to reduce wear and frictional forces. Air bag or cylinder assembly (14) is provided with an upper mounting lug (34) and a lower mounting lug (30). The bag (14) may be any type of suitable air cushion wherein the pressure in the cushion may be varied through an inlet/outlet valve (24). Suitable pneumatic or mechanical spring assemblies may be used where appropriate.

Figure 1A:
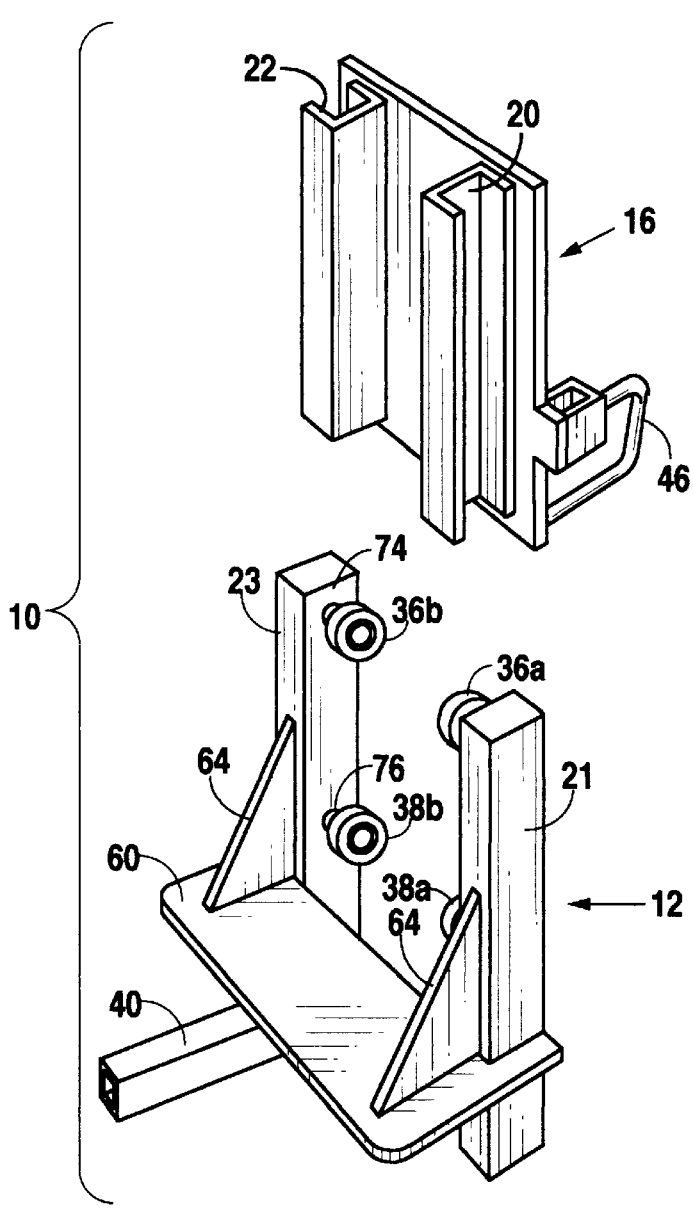
FIG. 1A illustrates an exploded perspective view of an alternative embodiment of the present invention with the rollers on the fixed support member and the tracks on the floating hitch component.

FIG. 1A illustrates an alternative embodiment (10a) wherein the rollers are attached to support ports (21) and (23) rigidly affixed to the fixed support member (12) while the guide tracks (20 and 22) are rigidly affixed to the floating component (16). The absorber (14) and other hardware is not shown in FIG. 1A but should be understood by reference to FIG. 1 discussed above.

To use the hitch, it must first be attached to the towing vehicle and assembled. This is accomplished by affixing the lower support member (12) to the existing vehicle bumper or receiver type trailer hitch. The airbag or cylinder (14) maybe initially inflated locally through air valve (24) (or by remote control) to adjust the bag's compressibility. The bag (14) is then attached to the lower support member (12) through opening (26) with fastener (28) tighten on threaded lug (30). The floating hitch member (16) is then attached to the opposite end of the air bag by fastener (32).

Attachment lug (34) is provided with suitable internal threads to accept air valve (24). Alternatively, a separate air inlet valve may be provided in the air bag (14).

The upper and lower bearing wheels or rollers (36a, 36b, 38a and 38b) are simultaneously inserted into the parallel guide tracks (20 and 22) extending upwardly along the side of the lower support member (12). A keeper bar (18) (only one shown) maybe attached to the top and/or bottom of the guide tracks of the lower support member so as to prevent the rollers from traveling past the ends of the tracks in case of excessive movement of the floating component (16).

Again, the present invention should be understood to apply where the rollers and tracks are reversed as shown in FIG. 1A.

Figure 3A:
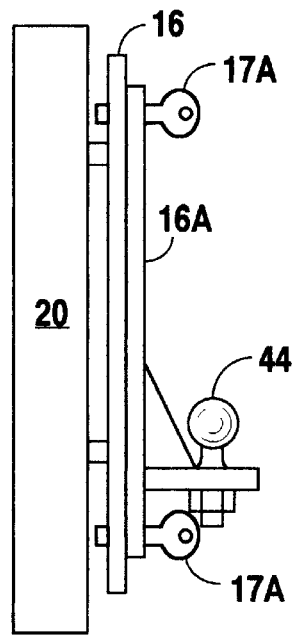
FIG. 3A depicts a side view of an alternative embodiment of the instant invention with a removable, rotatable ball mounting plate in a first position.
Figure 3B:
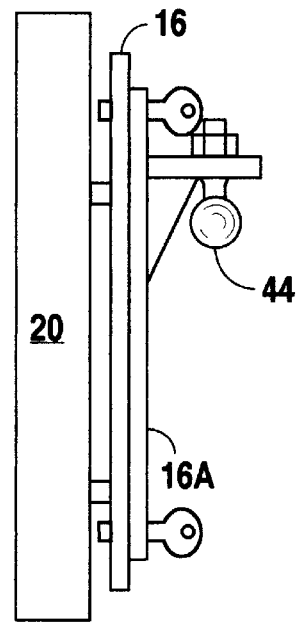
FIG. 3B shows the embodiment of FIG. 3A rotated 180° to reposition the ball.
Figure 2:
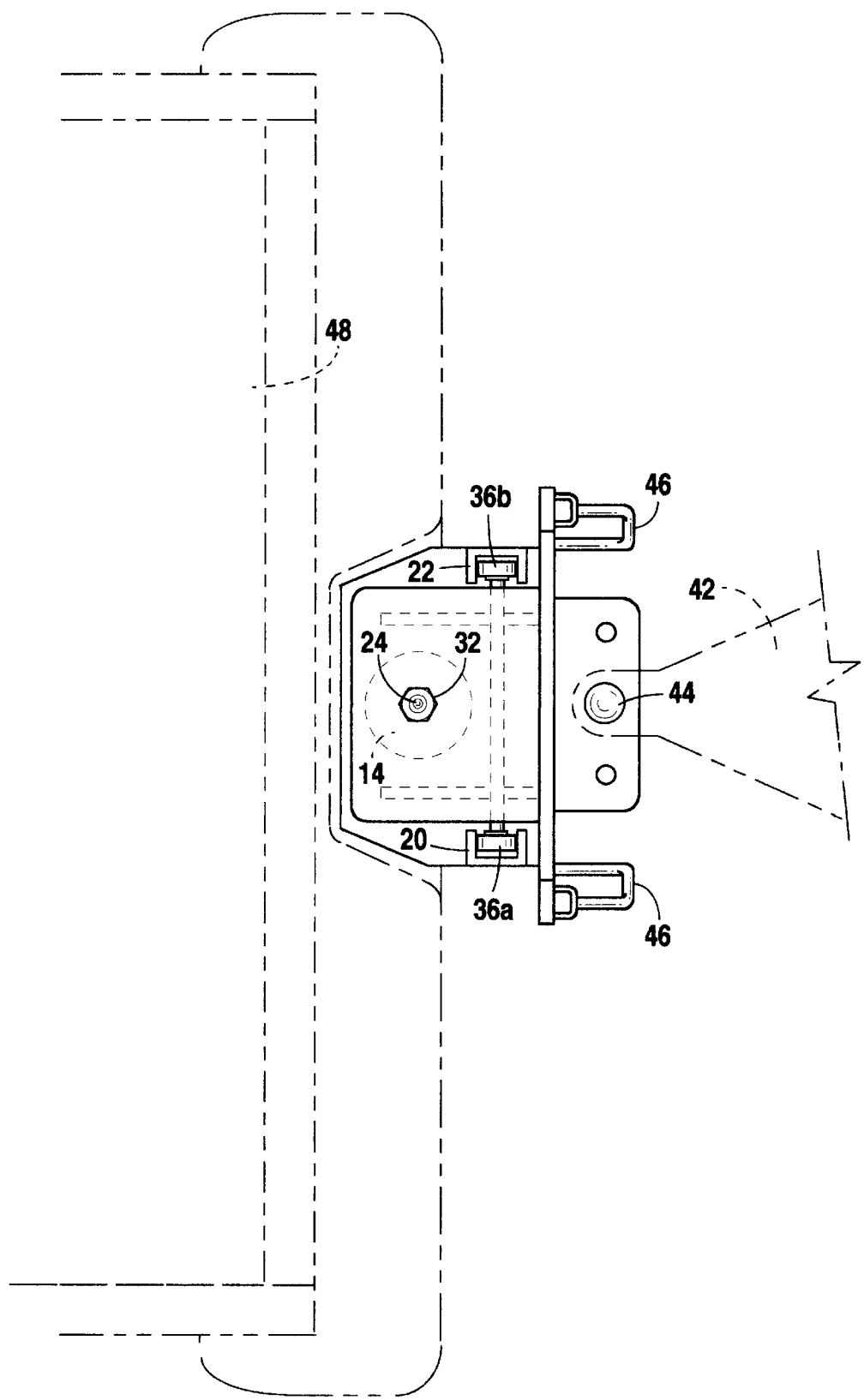
FIG. 2 is shows a top view of a first embodiment of the instant invention as mounted to a vehicle and trailer.
Figure 3:
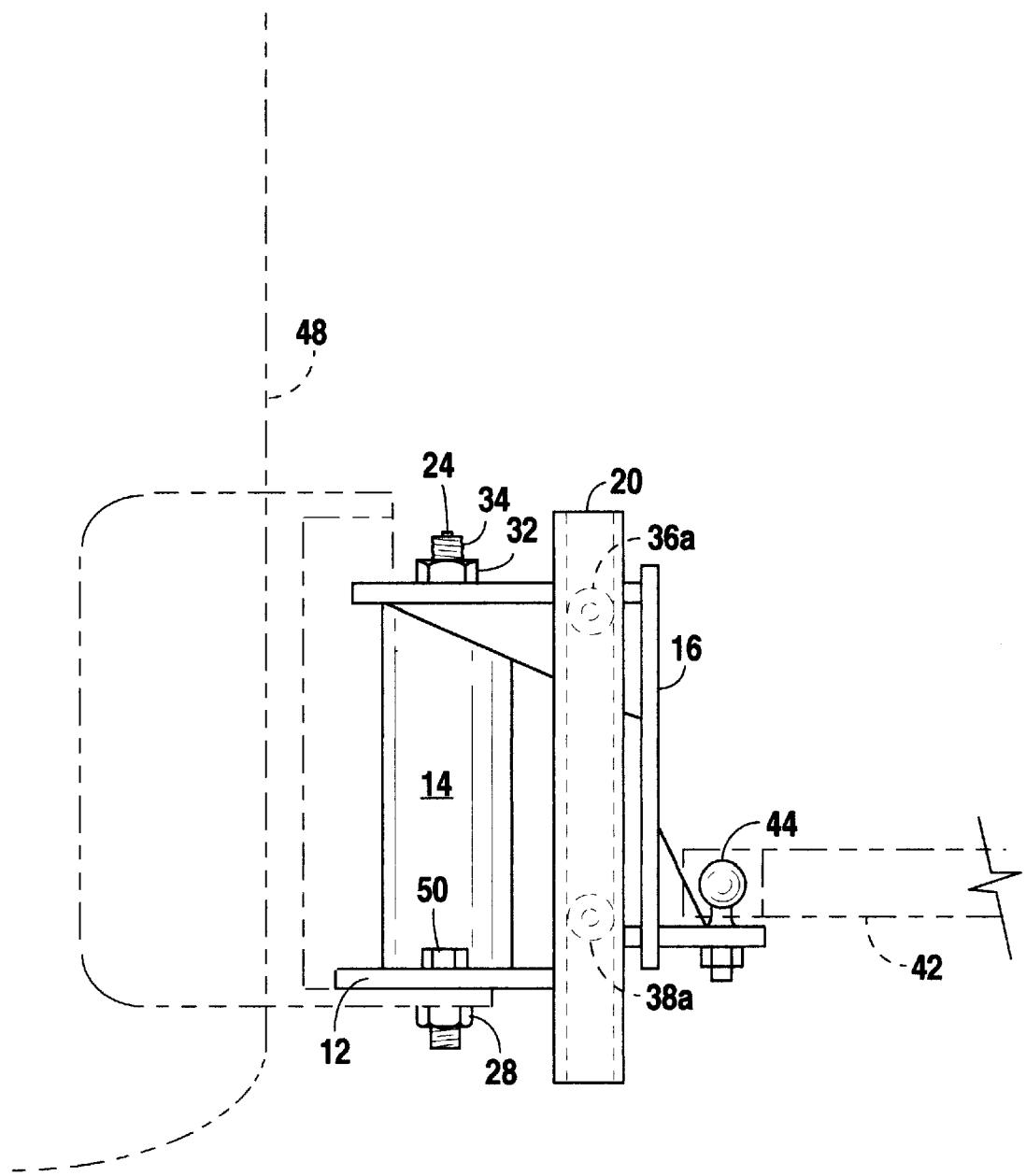
FIG. 3 depicts a side view of a first embodiment of the instant invention as mounted between a vehicle and attached trailer.

Turning now to FIGS. 2 and 3, it maybe seen that while the hitch assembly (10) is confined to limited vertical and horizontal movement by the rollers (36a, 36b, 38a and 38b) in tracks (20 and 22) and air bag assembly (14), the trailer (42) is free to articulate about the ball joint (44). Note that in FIGS. 2 and 3, the keeper bar of FIG. 1 is not shown. However, the keeper bar may be installed at either the top end of the guide tracks, the bottom end of the guide tracks, or dual keeper bars can be installed—one at the top and one at the bottom of the tracks.

The air pressure in the air bag shock absorber (14) may increase or decrease (0–100 psi), either locally or remotely, to adjust for varying road conditions and load weights. As an alternative, a lower bearing member stop maybe installed proximate to lower roller (38a and 38b) and positioned so as to interfere with the fixed lower support member (12) when a lower extreme of travel is reached, thereby protecting the air bag shock absorber (14).

Safety chain loops (46), adjacent to the ball joint (44), are used to maintain attachment between the towing vehicle (48) and trailer (42) in case of ball joint failure or detachment. In practice, two chains will be attached directly to the trailer and looped around the safety chain loops (46) of the trailer hitch assembly (10). Loops (46) may be spring pin operated as shown in FIGS. 1 and 2 or may simply be removable latch pins. Although the safety loops are shown attached to the floating component (16), it should be understood that the loops or manual safety pins may be attached to the fixed support member (12).

FIGS. 3A and 3B show another embodiment wherein a removvble, rotatable ball mounting plate (16A) is releasably attached via fasteners (17A) to floating component (16). FIG. 3B illustrates that plate (16A) may be removed, rotated and reattached to component (16) and thus vary the position of the ball.

Alternative embodiments of this invention involve adding additional absorber assemblies (e.g., from two to four units). Also, additional tracks and roller bearings may be used to handle additional weight and further restrict hitch assembly movement. The movable trailer hitch member (16) is characterized by a floating plate, because it appears to "float" on the shock absorber (14). The tracked rollers and shock absorber both contribute to independent movement of either the towing vehicle (48) or the trailer (42) connected to the hitch assembly (10). The floating plate may be designed to accept a ball hitch, a fifth wheel hitch, or a gooseneck type hitch for connection to various types of trailers. An air bag (14) maybe inflated at any air source to include service stations, air companies, tire pump stands, or manual pumps. Remote control of the air bag shock absorber (14) can also be accomplished by the driver using a portable compressed air tank and intercommunicating air lines running from the truck cab or other convenient location.

The improved trailer hitch assembly acts to reduce the stress and transfer of vibration between a towing vehicle and the trailer to which it is attached. The result is a better ride for the driver of the towing vehicle and any passengers or freight carried in the attached trailer.

Figure 4:
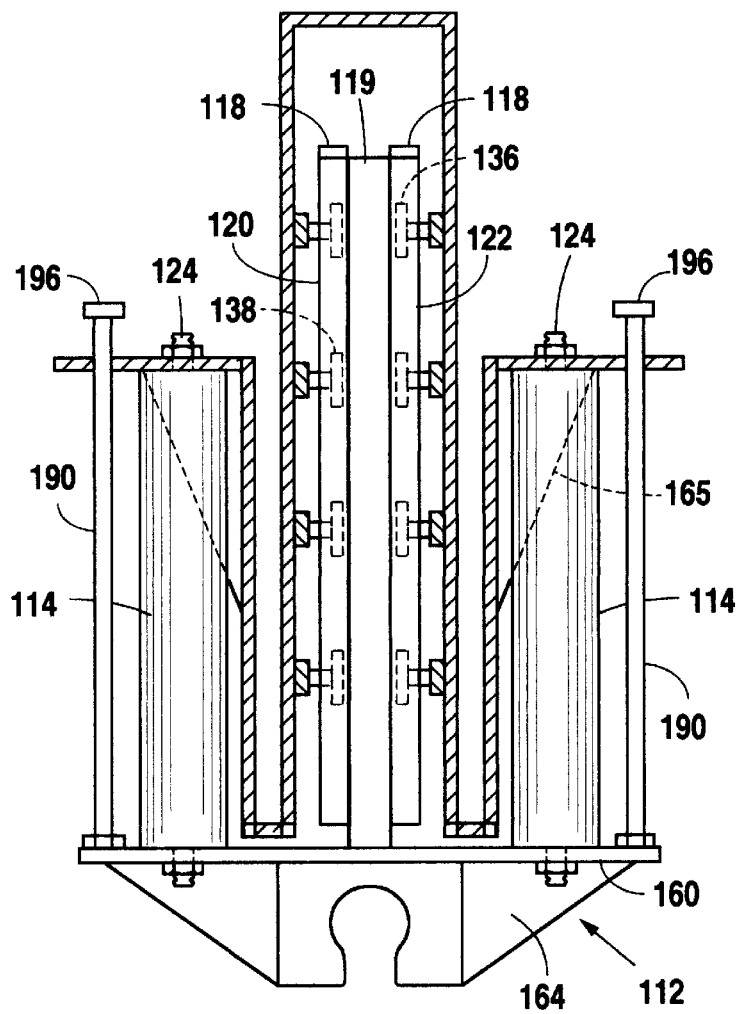
FIG. 4 illustrates a gooseneck embodiment of the present invention.

FIG. 4 illustrates a gooseneck embodiment (110) of the present invention. Again, the major components are a fixed support member (112) which is attachable to the towing vehicle, a variable-pressure shock absorber assembly (114) made up in this embodiment by a plurality of air bags; and a movable or floating hitch component (116) (shown in cross-section) which is attachable to a trailer. Keeper bars (118) are shown affixed to the top of the guide tracks (120 and 122). Each air bag is provided with an appropriate air valve (124) to enable the user to increase or decrease the pressure within the shock absorbers from 0–100 psi depending upon the road and load conditions. With mechanical spring assemblies acting as the absorber, springs may be tensioned as is known in the art.

Because the movable hitch component (116) must be mounted to the trailer gooseneck, a generally cylindrical housing (117) is provided to fit within and be secured by standard gooseneck hardware as seen in FIG. 6. Roller sets (136 and 138) are affixed in spaced apart, parallel relationship along opposite sides of the inside of housing(117). Roller sets (136 and 138) cooperate with guide tracks (120 and 122) which extend vertically upward from mounting plate (160) and are attached to support beam (119).

Stop rods (190) are rigidly attached at one end to the support plate (112). The top end of rods (190) slidingly pass through openings (191) in the shoulder flange (194) of the hitch component (116). Stop caps (196) are attached to the second end of rods (190) and serve to limit the displacement of the hitch assembly and protect the air shock absorbers.

Figure 5:
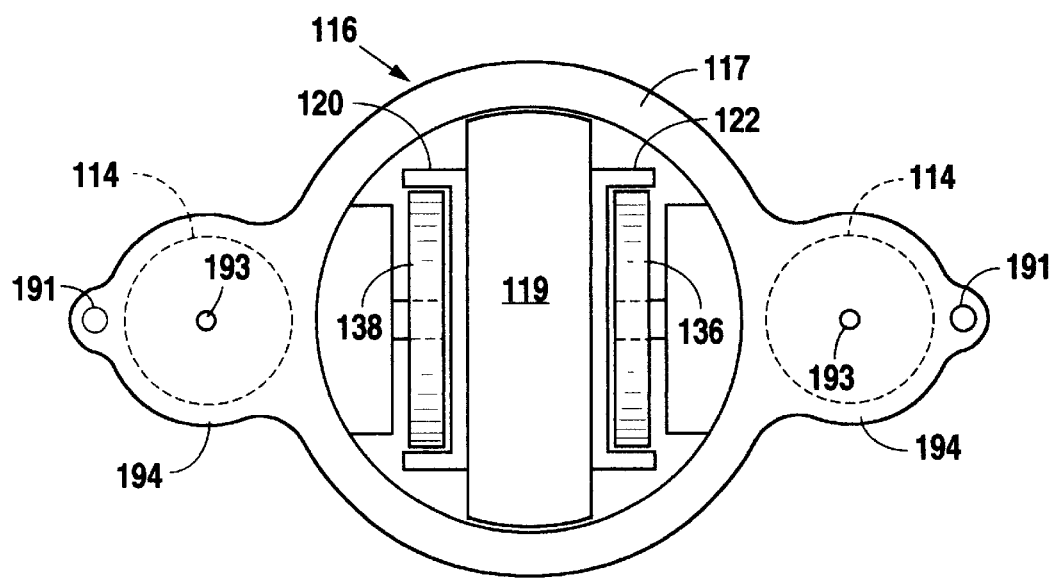
FIG. 5 shows a top view of the gooseneck embodiment.

In FIG. 5, it maybe seen that rollers extend into and are guided by guide tracks (120 and 122) which are attached to and supported by beam (119) which is, in turn, attached to the support member (12). The air bags (114) are shown in dotted lines. Stop rod openings (191) may be seen at the outer edge of the flange (194).

The floating component (116) is shown in detail in FIG. 6. Cylindrical housing (17) is fitted into the standard gooseneck (300) of a trailer (not shown). The housing (117) is retained and secured in the gooseneck by standard gooseneck hardware, such as lock nuts (302) well known in the trailer art. The air bags (114) are shown in dotted lines for clarification. The air bags are attachable to flange (194) through opening (193).

Each roller (136 and 138) is rotatably attached to a shaft (174) which extends radially from the inner wall of housing (117). The rollers are easily replaceable and may be maintained through opening (169) when the assembly (110) is not in operation. Gussets (165) support flange (194) and ensure there is no twisting of the housing (117) which could result in binding of the rollers in the guide tracks.

Figure 5A:
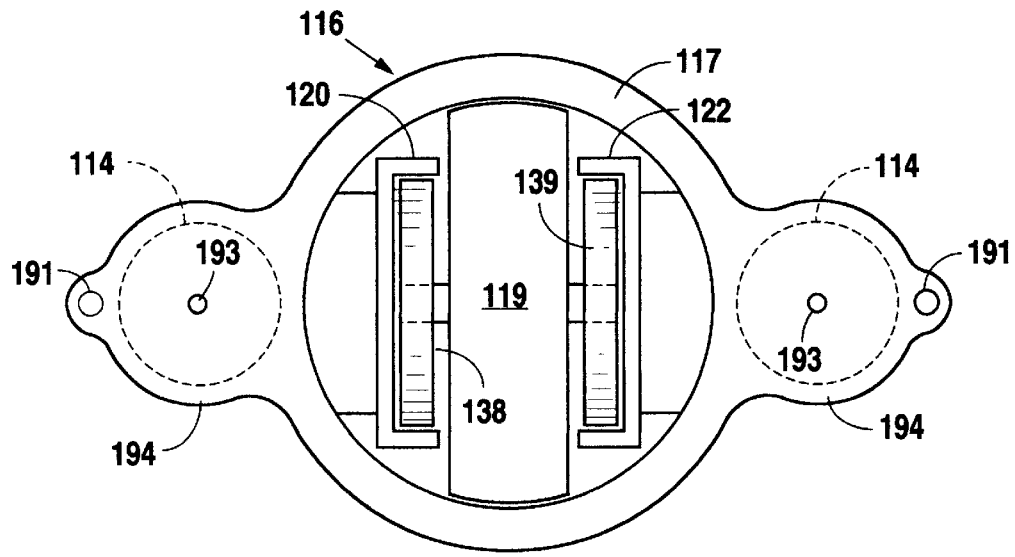
FIG. 5A shows a top view of an alternative gooseneck embodiment wherein the rollers are on the fixed, support member and the tracks are on the floating hitch component.
Figure 9A:
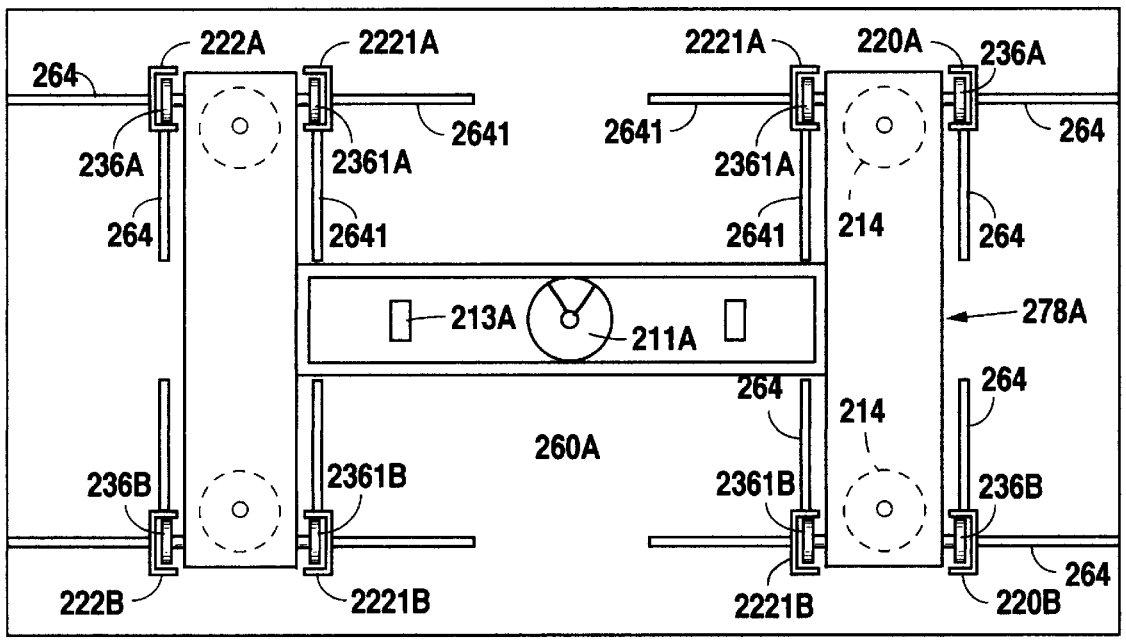
FIG. 9A illustrates a top view of an alternative embodiment of a fifth-wheel arrangement wherein additional rollers and tracks have been added and an "H"-shaped frame is employed.

An alternative embodiment the present invention is shown in FIG. 5A, wherein the tracks (120 and 122) have been affixed to the floating hitch component (116) while the rollers (138 and 139) have been affixed to the fixed support beam (119) of the fixed support member (112). One of skill in the art should understand how appropriate reversal of other components of the embodiment of FIGS. 4, 5, 6, and 7 would result in the embodiment of FIG. 5A.

FIG. 7 illustrates the fixed support member (112) which is attachable to the towing vehicle. Gussets (164) strengthen the base plate (160) to ensure there is no twisting of the beam (119) or guide tracks (120 and 122). Any standard means of attachment may be used to affix the support member (112) to the vehicle.

FIGS. 8 through 11 disclose an alternative embodiment (210) of the present invention which maybe utilized in a fifth-wheel arrangement for trucks, recreational vehicles, and tractor trailers. FIG. 8 illustrates a standard fifth-wheel plate (211) mounted to the floating hitch component (216) by fasteners (213). It should be understood that there are various fifth-wheel assemblies which include swivels as part of the original equipment. These various arrangements may be mounted to the floating plate (278) of the hitch component (216). Four roller sets (236a, 236b, 238a and 238b) extend laterally outwardly from the legs (215 and 217) of the floating plate (278). The roller sets are spaced apart and generally parallel to each other. Gussets (265) support the legs (215 and 217) and ensure there is no twisting or distortion of the arrangement of the roller sets.

A plurality of variable pressure air shock absorbers (214) are mounted at their top ends to the floating plate (278). The attachment should be readily understood as being similar to that described with the previous embodiments (10 and 110)

FIG. 9 shows that four separate bags (214) may be affixed to each corner of the floating plate. Depending on the load distribution, the pressure in each bag (214) may be independently varied.

FIG. 8 further shows that the fixed support member (212) is provided with a base plate (260) which accepts and secures the bottom end of the shock absorbers. Four separate guide tracks (220a, 220b, 222a and 222b) extend upwardly from the corners of the base plate (260) and are secured by gussets (264). The four tracks accept and guide the four roller sets as should be readily understood.

As with the other embodiments (10 and 110), the tracks may be provided with keepers or stops (218) at the top of the track and stops (219) at a lower end of the track. These restrict the movement of the floating plate (278) to protect the air shock absorber (214).

The base plate (260) may be secured to the truck bed by attachment ears (247) which are rigidly affixed to plate (260). Thus, the support member is attached directly to the towing vehicle.

FIG. 9 is a top view of the fifth-wheel embodiment (210) without the original equipment mount (211) and without the top keeper (218). The mounting holes (227) for the mount (211) are shown. As may be seen, the rollers and guide tracks are positioned at each corner of the assembly (210) to provide guidance for the floating plate (278).

Figure 10:
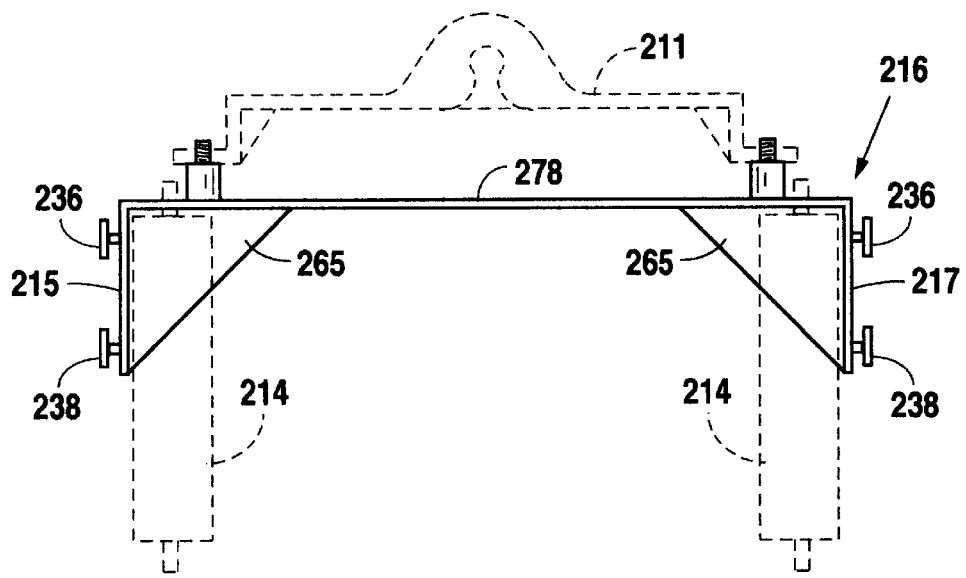
FIG. 10 is a side elevation view of the floating hitch component of the fifth-wheel embodiment of the present invention.

FIG. 10 shows the floating hitch component (216) and its various arrangement of elements.

Figure 11:
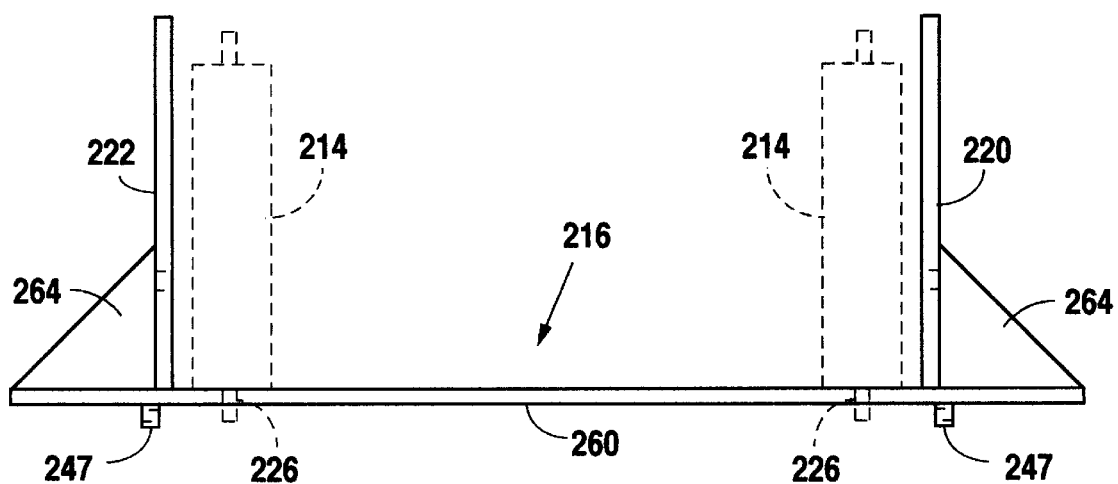
FIG. 11 illustrates a side elevation view of the support member of the fifth-wheel embodiment of the present invention.

FIG. 11 illustrates the various elements of the support member (216). Both FIGS. 10 and 11 show the air shock absorbers in dotted lines.

Turning back to FIG. 9A, there is shown an alternative embodiment of the fifth-wheel arrangement. Additional rollers (2361A and 2361B) and additional tracks (2221A and 2221B) have been added. The plate (278) of the embodiment of FIG. 9 has been replaced by a light, strong construction "H"-shaped channel (278A). Otherwise, the embodiment of FIG. 9A functions as noted above for the device of FIG. 9.

As previously discussed in the other alternative embodiments, the rollers and tracks may be reversed where appropriate. The floating plate (278) or the "H"-shaped channel (278A) may be provided with the guide tracks while the fixed support component (212) with the base plate (260A) is adapted to receive and retain the rollers (236A, 2361A, 236B, and 2361B), as would be understood by one skilled in the art.

Although the invention has been described with reference to specific embodiments, this description is not meant to be continued in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A trailer hitch assembly for attachment to a vehicle and a trailer for towing said trailer comprising:

a fixed support member attachable to said trailer, said support member further comprising a plurality of spaced apart, generally parallel, rotatable rollers;

a floating hitch member attachable to said vehicle, said hitch member further comprising a plurality of spaced apart, generally parallel guide tracks;

a variable pressure absorber assembly attached at a first end to said fixed support member and to a second end to said floating hitch member;

said rollers engaging said tracks when said vehicle is attached to said trailer.

2. The assembly of claim 1 wherein said hitch member further comprises a generally horizontal mounting plate adopted to retain a first end of said absorber assembly;

said plurality of guide tracks being first and second U-shaped channels extending vertically from said mounting plate;

said plurality of rotatable rollers being an upper set of two rollers and a lower set of two rollers, a first of said rollers of said upper set and a first of said rollers of said lower set engagable with said first U-shaped channel and a second of said rollers of said upper set and a second of said rollers of said lower set engagable with said second U-shaped channel;

said floating hitch member further comprises a floating plate adapted to retain a second end of said absorber assembly.

3. The assembly of claim 1 wherein said floating hitch member is further attachable to a gooseneck trailer mount.

4. The assembly of claim 1 wherein said floating member is further attachable to a fifth-wheel mount.

5. The assembly of claim 1 further comprising a housing on said floating hitch member engagable within a gooseneck trailer mount, said rollers extending laterally inward in said housing and engagable with said guide tracks, said guide tracks extending vertically inside said housing.

6. The assembly of claim 5 further comprising:

a movement stop attached to said support member.

* * * * *